(12) United States Patent
Saxe et al.

(10) Patent No.: US 7,979,648 B2
(45) Date of Patent: Jul. 12, 2011

(54) DYNAMIC INTERLEAVING

(75) Inventors: Eric C. Saxe, Livermore, CA (US);
Sherry Q. Moore, Fremont, CA (US);
Darrin P. Johnson, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 534 days.

(21) Appl. No.: 12/130,491

(22) Filed: May 30, 2008

(65) Prior Publication Data

US 2009/0300299 A1    Dec. 3, 2009

(51) Int. Cl.
*G06F 12/00* (2006.01)
(52) U.S. Cl. .................................. 711/157; 711/158
(58) Field of Classification Search .................... 711/157
See application file for complete search history.

(56) References Cited

U.S. PATENT DOCUMENTS

2005/0246508 A1* 11/2005 Shaw ............................ 711/157
2007/0011421 A1* 1/2007 Keller et al. ................... 711/165
2008/0043562 A1* 2/2008 Totolos et al. ................ 365/227

* cited by examiner

*Primary Examiner* — Tuan V Thai
*Assistant Examiner* — Ngoc V Dinh
(74) *Attorney, Agent, or Firm* — Brooks Kushman P.C.

(57) ABSTRACT

Methods and apparatus provide for a Dynamic Interleaver to modify the interleaving distribution spanning physical memory modules. Specifically, dynamic interleaving provides the ability to increase the number of interleaved physical memory modules when a current interleaved group of memory locations is experiencing heavy use. By increasing the number of interleaved memory locations, a system can make optimal use of memory by allowing more parallel accesses to physical memory during the period of heavy utilization. However, if the current interleaved group of memory locations experience low use, the Dynamic Interleaver can choose to interleave across fewer physical memory modules and apply power management techniques to those memory locations that are no longer being accessed. Prior to "re-interleaving" interleaved memory locations, the Dynamic Interleaver migrates data out of the current interleaved memory locations. After re-interleaving, the Dynamic Interleaver maps the data back into the re-interleaved memory locations.

20 Claims, 9 Drawing Sheets

DYNAMIC INTERLEAVING

BACKGROUND

Interleaving is an advanced technique used to improve memory performance. Interleaving works by mapping a physical address space across multiple physical memory modules to increase the probability that multiple memory transactions will execute in parallel. Interleaving thereby increases bandwidth by allowing simultaneous access to more than one physical memory module (i.e. a chunk of memory that can be accessed at a given time). This improves performance because the processor can transfer more information to/from memory in the same amount of time, and helps alleviate the processor-memory bottleneck that is a major limiting factor in overall performance.

In order to achieve better performance, interleaving spreads out consecutive memory addresses across different physical memory modules. For example, if a system has 4 physical memory modules of interleaved memory, the system doesn't fill the first physical memory module, and then the second and so on. It uses all 4 physical memory modules, such that the first and fifth memory locations are at the first physical memory module, the second and sixth memory locations are at the second physical memory module, the third and seventh memory locations are at the second physical memory module etc.

Thus, in an interleaved group of physical memory modules, each physical memory module is accessed using different sets of control lines, which are merged together on the memory bus. For example, when a read or write is begun to the first memory location, a read or write to the second memory location can be overlapped with the first one. The more physical memory modules that are interleaved, the more overlapping can be done. It is understood that interleaving configurations implemented in small and large computer systems can vary in terms of the number of physical memory modules that are interleaved.

SUMMARY

Conventional interleaving techniques suffer from a variety of deficiencies from the perspective of power and performance optimization. In particular, the static nature in which conventional systems implement interleaving prohibits conventional systems to alter the degree of interleaving in response to a current utilization of its interleaved physical memory modules. For example, conventional systems that implement interleaving select a particular interleaving configuration for physical memory modules at boot time. The interleaving configuration remains unchanged regardless of the demand placed on the interleaved memory locations by processes using the memory locations. Currently, if conventional systems seek to change the interleaving configuration, a reboot of the system is required.

Thus, static interleaving by conventional systems does not allow for effectively optimizing the power efficiency of interleaved memory while maintaining desirable performance metrics. In conventional interleaving, granular power management of a subset of physical memory modules that belong to a particular interleaved group is not possible. Such power management is not possible because it disrupts the physical address range defined for the interleaved group. Thus, conventional interleaving requires that all the memory modules in an interleaved group continue to be interleaved even when they are not being heavily utilized. Leaving all physical memory modules in an under-utilized interleaved group results in an undesirable amount of wasteful power consumption.

Techniques discussed herein significantly overcome the deficiencies of conventional applications such as those discussed above as well as additional techniques also known in the prior art. As will be discussed further, certain specific embodiments herein are directed to a Dynamic Interleaver. The one or more embodiments of the Dynamic Interleaver as described herein contrasts with conventional interleaving to allow interleaved groups of physical memory modules to be dynamically re-interleaved—without requiring a reboot of the entire system.

Dynamic interleaving provides the ability to increase the number of interleaved physical memory modules when a current interleaved group of memory locations is experiencing heavy use. By increasing the number of interleaved memory locations, a system can make optimal use of memory by allowing more parallel accesses to physical memory during the period of heavy utilization. However, if the current interleaved group of memory locations experience low use, the Dynamic Interleaver can choose to interleave across fewer physical memory modules and apply power management techniques to those memory locations that are no longer being accessed.

Prior to "re-interleaving" a set of interleaved memory locations, the Dynamic Interleaver migrates data out of the current interleaved memory locations. After re-interleaving, the Dynamic Interleaver maps the data back into the re-interleaved memory locations.

Thus, the Dynamic Interleaving allows for an improvement in the granularity with which a system can power manage a given range of physical memory. Further, by employing page migration techniques to physically move data out of the memory locations that are to be "re-interleaved", the interleaving distribution can be changed in a way that is transparent and non-disruptive to virtual memory address space consumers.

For example, the Dynamic Interleaver applies a first interleaving distribution to memory locations in multiple physical memory modules (i.e. configures the interleave across a given set of physical memory modules). As existing processes utilize the memory in the interleaved group, the Dynamic Interleaver monitors their utilization. By monitoring utilization by existing processes, the Dynamic Interleaver can detect a heavy access pattern on the interleaved physical memory modules.

In order to increase memory bandwidth, the Dynamic Interleaver defines a second interleaving distribution to create a new interleaved group of physical memory modules with more interleaved memory locations. In other words, the Dynamic Interleaver configures an interleaved group where memory is interleaved across a greater number of physical memory modules (e.g. with a greater number degree of interleave). For example, the current group of interleaved group of physical memory modules can be re-interleaved with additional physical memory modules according to the second interleaving distribution. In the alternative, the Dynamic Interleaver can release the current group of interleaved group of physical memory modules from the first interleaving distribution and dynamically interleave a group of unused (and/or slightly unused) physical memory modules according to the second interleaving distribution.

In another example, the Dynamic Interleaver can also detect a low access pattern on the interleaved physical memory modules. Thus, some memory locations in the interleaved physical memory modules are consuming power even though existing processes are not reading from and writing to those particular memory locations. In order to decrease the power consumed by the interleaved physical memory modules, the Dynamic Interleaver defines a second interleaving distribution to create a new interleaved group of physical memory modules with less interleaved memory locations. For example, one or more physical memory modules can be released from the current group of interleaved physical memory modules. The remaining (i.e. unreleased) physical memory modules can be re-interleaved according to the second interleaving distribution. Along with re-interleaving the remaining physical memory modules, the Dynamic Interleaver sets the states of the released physical memory modules to states that consume less power.

In one embodiment of the Dynamic Interleaver, a memory space can include a first set of memory locations configured according to a first interleaving distribution. The Dynamic Interleaver monitors the first set of memory locations (i.e. memory addresses) to determine the extent of their user by existing processes. Thus, as the Dynamic Interleaver monitors the first set of memory locations, it detects a utilization attribute of a portion of the first set of memory locations in the memory space. Upon detecting the utilization attribute, the Dynamic Interleaver dynamically interleaves a second set of memory locations in the memory space according to a second interleaving distribution.

In another embodiment, upon detecting a heavy access pattern on the first set of memory locations, the Dynamic Interleaver defines the second set of memory locations in the memory space as having more memory locations than the first set of memory locations. The second set of memory locations is defined by the Dynamic Interleaver while memory locations (i.e. memory addresses) from the first set of memory locations are being accessed according to the first interleaving distribution. After defining the amount of the memory locations for the second set of memory locations, the Dynamic Interleaver configures the second set of memory locations in the memory space according to the second interleaving distribution such that the second interleaving distribution spans the second set of memory locations.

In yet another embodiment, upon detecting a low access pattern on the first set of memory locations, the Dynamic Interleaver defines the second set of memory locations in the memory space as having less memory space locations than the first set of memory locations. The second set of memory locations is defined by the Dynamic Interleaver while memory locations from the first set of memory locations are being accessed according to the first interleaving distribution. After defining the amount of the memory locations for the second set of memory locations, the Dynamic Interleaver configures the second set of memory locations in the memory space according to the second interleaving distribution such that the second interleaving distribution spans the second set of memory locations.

It is noted that, in various embodiments of the Dynamic Interleaver, when the configuration (i.e. interleaving distribution) is changed while processes utilize the configured memory locations, the Dynamic Interleaver relocates data in the configured memory locations prior to changing the configuration (i.e. interleaving distribution). Thus, there will be no loss of data as a result of the re-interleave.

For example, the Dynamic Interleaver performs page migration by allocating a physical page of memory to retain the relocated data. The virtual-to-physical mappings of those processes using that data are updated to reflect the new location(s) of the relocated data.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Sun Microsystems Incorporated of Santa Clara, Calif., U.S.A., herein after referred to as "Sun."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Dynamic Interleaver, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods and apparatus provide for a Dynamic Interleaver to continually modify an interleaving distribution that spans memory locations in one or more physical memory modules. By dynamically re-interleaving the memory locations, the Dynamic Interleaver ensures that interleaved address ranges are not disrupted while the Dynamic Manager manages the power consumption of the currently interleaved physical memory modules. It is understood that an interleaving distribution is a particular addressing scheme for memory locations in one or more physical memory modules.

As used herein, in various embodiments, the term "memory space" can be understood to be one or more physical memory modules.

As used herein, in various embodiments, the term "memory location" can be understood to be an area of storage within a physical memory module. Each memory location is included in a given physical address range of the memory space.

As used herein, in various embodiments, the term "interleaving distribution" can be understood to be an interleaving configuration (or a degree of interleaving) applied to one or more physical memory modules in the memory space.

As used herein, in various embodiments, the phrase "dynamically interleaving a second set of memory locations in the memory space according to a second interleaving distribution" can be understood to describe changing how a given physical address range maps to underlying hardware according to a new interleaving configuration.

It is understood that existing processes use the memory space via virtual memory addresses that map to the memory locations.

In one embodiment, when the Dynamic Interleaver releases a first set of memory locations from a first interleaving distribution to thereby define a second interleaving distribution, the Dynamic Interleaver migrates data stored in the first set of memory locations to another set of memory locations that will not be re-interleaved. Such data can be associated with existing processes. By releasing the first set of memory locations, the Dynamic Interleaver removes the first set of memory locations from operating system usage. Since the data has been migrated out of the first set of memory locations, it will not be disrupted when the Dynamic Interleaver configures the second set of memory locations according to the second interleaving distribution (i.e. changes the interleaving factor, changes the degree of interleaving).

For some embodiments of the Dynamic Interleaver, it is understood that memory interleaving is a strategy for laying out a physical memory address space across a number of physical memory modules in round robin fashion where the "interleave granularity" is the "block size" and the "degree of interleave" is the number of physical memory modules across which a given expanse of physical memory is interleaved.

Further, an "interleaved group" can be defined as a group of physical memory modules across which a given expanse of physical memory is interleaved. An interleaved group therefore represents a power manageable expanse of physical memory against which utilization should be monitored for the purpose of determining if the memory interleaving configuration across the group should be adjusted to better meet power and/or performance objectives. Re-interleaving thereby refers to the process of changing the degree and/or granularity of interleaving for an interleaved group.

Figure 1:
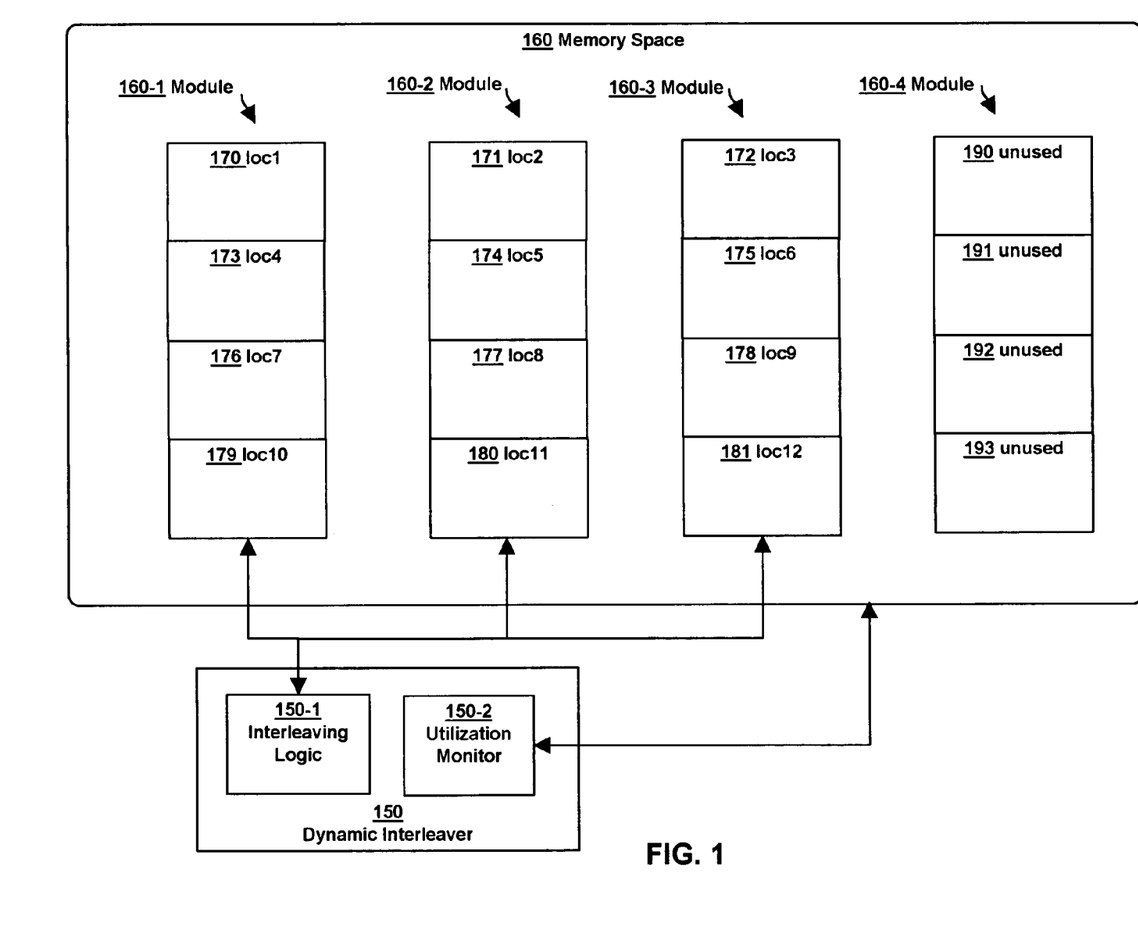
FIG. 1 is an example block diagram of a memory space that is monitored by a Dynamic Interleaver according to embodiments herein.

Turning now to FIG. 1, FIG. 1 is an example block diagram of a memory space 160 that is monitored by a Dynamic Interleaver 150 according to embodiments herein.

In one embodiment of the Dynamic Interleaver 150, the memory space 160 can include four physical memory modules 160-1, 160-2, 160-3, 160-4 in the memory 112 of a computer system 110. As depicted in FIG. 1, three physical memory modules 160-1 ... 160-3 are interleaved according to a first interleaving distribution. The Dynamic Interleaver 150 defines the first interleaving distribution via interleaving logic 150-1 such that one physical memory module 160-1 includes the first, fourth, seventh and tenth memory locations 170, 173, 176, 179. The second physical memory module 160-2 interleaved according to the first interleaving distribution includes the second, fifth, eighth, and eleventh memory locations 171, 174, 177, 180. The third physical memory module 160-3 interleaved according to the first interleaving distribution includes the third, sixth, ninth and twelfth memory locations 172, 175, 178, 181. Thus, the first interleaving distribution includes three physical memory modules 160-1, 160-2, 160-3 and spans twelve memory locations 170 ... 181.

While the three physical memory modules 160-1, 160-2, 160-3 are interleaved according to the first interleaving distribution, the memory space 160 can include an additional physical memory module 160-4 with unused memory locations 190, 191, 192, 193. It is understood that the memory space can include any number of interleaved physical memory modules and non-interleaved physical memory modules. It is also noted that the memory space 160 can include slightly unused memory locations in the additional physical memory modules that do not belong to an interleaved group.

As existing processes read from and write to the first set of memory locations 170 ... 181, a utilization monitor 150-2 can monitor the extent of the use of the first set of memory locations 170 ... 181 that are interleaved according to the first interleaving distribution. The utilization monitor 150-2 also monitors the power consumed by each memory location 170 ... 181 and interleaved physical memory module 160-1, 160-2, 160-3. When the power consumption of any of the memory locations 170 ... 181 or interleaved physical memory modules 160-1, 160-2, 160-3 outweighs the memory bandwidth advantages of the first interleaving distribution, the utilization monitor 150-2 can determine that a new interleaving distribution must be applied to the memory locations 170 ... 181, 190 ... 193 in the memory space 160.

Figure 2:
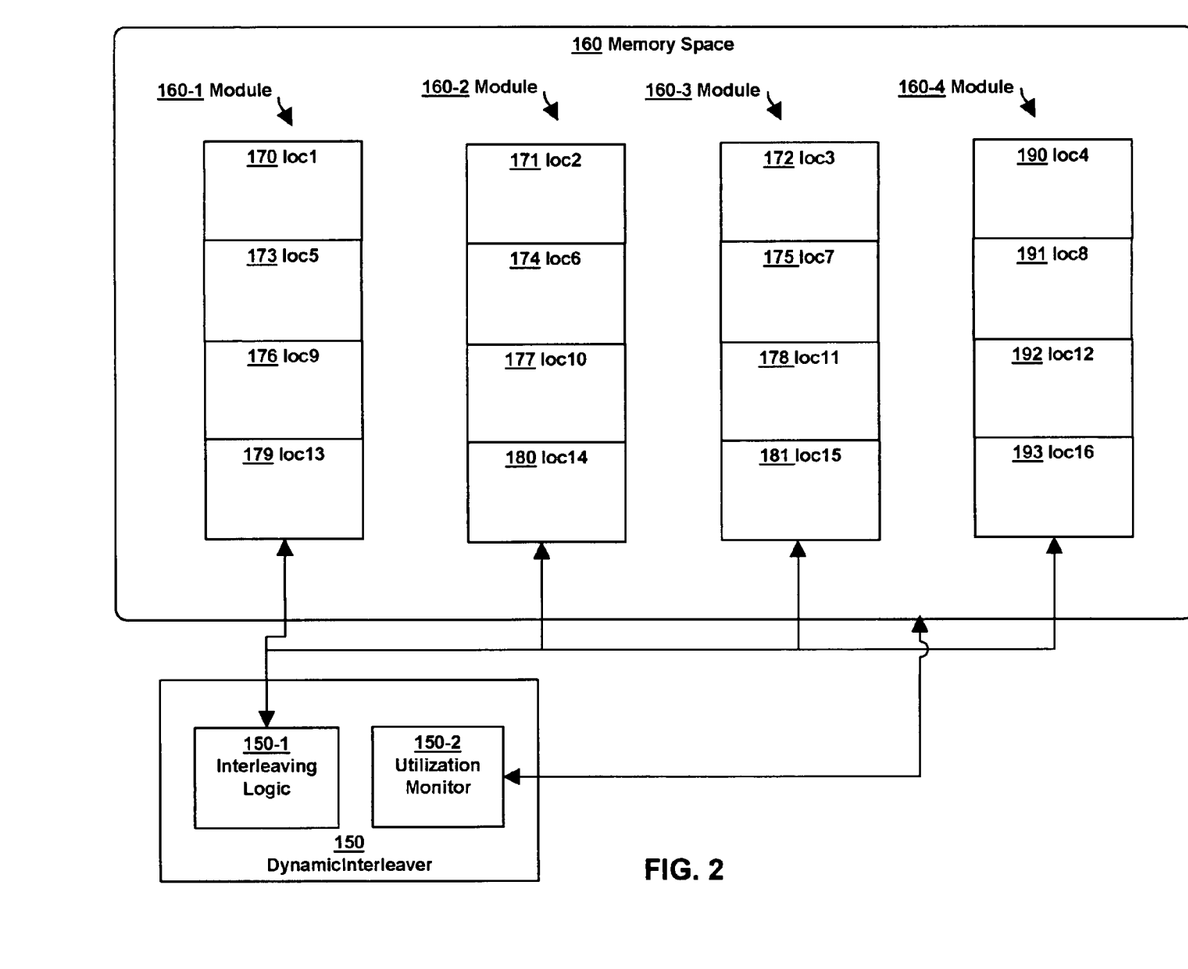
FIG. 2 is an example block diagram of a Dynamic Interleaver, according to embodiments herein, that is dynamically interleaving a memory space according to a second interleaving distribution that spans more memory locations than a first interleaving distribution.

Referring now to FIG. 2, FIG. 2 is an example block diagram of a Dynamic Interleaver 150, according to embodiments herein, that is dynamically interleaving a memory space 160 according to a second interleaving distribution that spans more memory locations 170 ... 181, 190, 191, 192, 193 than a first interleaving distribution (the interleaving distribution from FIG. 1 that spans memory locations 170 ... 181).

In one embodiment of the Dynamic Interleaver 150, as existing processes write to and read from the memory locations 170 ... 181 interleaved according to the first interleaving distribution, the utilization monitor 150-2 detects a heavy access pattern on a portion of the interleaved memory locations 170 ... 181 by the processes. Upon detecting the heavy access pattern, the Dynamic Interleaver 150 determines a new interleaving distribution to increase memory bandwidth.

The Dynamic Interleaver applies interleaving logic 150-1 to define a second set of memory locations 170 ... 181, 190 ... 193 in the memory space 160 as having more memory space locations than the first set of memory locations 170 ... 181. Thus, a second interleaving distribution is defined for the second set of memory locations 170 ... 181, 190 ... 193 while memory locations 170 ... 181 are still being accessed by (or addressed for, written by, read by) existing processes according to the first interleaving distribution.

The Dynamic Interleaver 150 defines the second interleaving distribution to span four physical memory modules 160-1, 160-2, 160-3, 160-4. One physical memory module 160-1 includes the first, fifth, ninth and thirteenth memory locations 170, 173, 176, 179. A second physical memory module 160-2 interleaved according to the second interleaving distribution includes the second, sixth, tenth and fourteenth memory locations 171, 174, 177, 180. A third physical memory module 160-3 interleaved according to the second interleaving distribution includes the third, seventh, eleventh and fifteenth memory locations 172, 175, 178, 181. A fourth physical memory module 160-4 is also interleaved to include previously unused memory locations as the fourth, eighth, twelfth and sixteenth memory locations 190, 191, 192, 193 in the second interleaving distribution.

After defining the second set of memory locations 170 ... 181, 190 ... 193, the Dynamic Interleaver 150 releases the first set of memory locations 170 ... 181 from the first interleaving distribution and dynamically configures the memory locations 170 ... 181, 190 ... 193 according to the second interleaving distribution such that the second interleaving distribution spans the second set of memory locations 170 ... 181, 190 ... 193.

By increasing the number of interleaved memory locations 170 ... 181, 190 ... 193, the Dynamic Interleaver decreases the power consumption burden currently experienced as the existing processes access memory locations 170 ... 181 interleaved according to the first interleaving distribution. It is noted that the Dynamic Interleaver 150 can define the second set of memory locations 170 ... 181, 190 ... 193 interleaved according to the second interleaving distribution to also include slightly unused memory locations in the memory space—as opposed to only unused memory locations. It is understood that such slightly unused memory locations have utilization attributes that describe less usage than the heavy access pattern detected by the utilization monitor 150-2.

Figure 3:
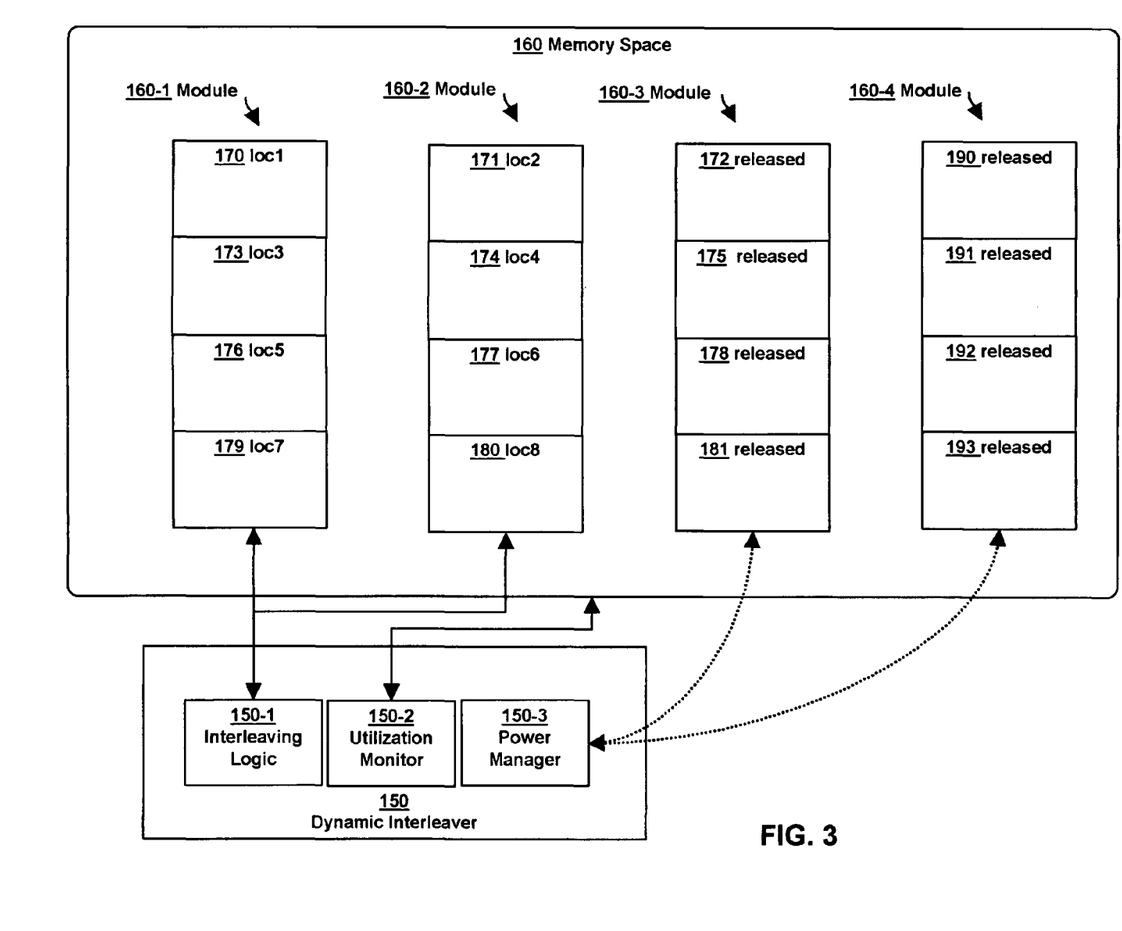
FIG. 3 is an example block diagram of a Dynamic Interleaver, according to embodiments herein, that is dynamically interleaving a memory space according to a second interleaving distribution that spans less memory locations than a first interleaving distribution.

FIG. 3 is an example block diagram of a Dynamic Interleaver 150, according to embodiments herein, that is dynamically interleaving a memory space 160 according to a second interleaving distribution that spans less memory locations 170, 171, 173, 174, 176, 177, 179, 180 than a first interleaving distribution (discussed as a second interleaving distribution in FIG. 2 that spans memory locations 170 ... 181, 190 ... 193).

In one embodiment of the Dynamic Interleaver 150, the utilization monitor 150-2 can detect a low access pattern from existing processes on a portion of the first set of memory locations 170 ... 181, 190 ... 193 that are interleaved according to the first interleaving distribution. Upon detecting the low access pattern, the Dynamic Interleaver 150 applies interleaving logic 150-1 to define the second set of memory locations 170, 171, 173, 174, 176, 177, 179, 180 in the memory space 160 as having less memory space locations than the first set of memory locations 170 ... 181, 190 ... 193. Thus, the second interleaving distribution is defined for the second set of memory locations 170, 171, 173, 174, 176, 177, 179, 180 while memory locations 170 ... 181, 190 ... 193 are still being accessed by (or addressed for, written by, read by) existing processes according to the first interleaving distribution.

The Dynamic Interleaver 150 defines the second interleaving distribution to span two physical memory modules 160-1, 160-2. One physical memory module 160-1 includes the first, third, fifth and seventh memory locations 170, 173, 176, 179. The second physical memory module 160-2 interleaved according to the second interleaving distribution includes the second, fourth, sixth and eighth memory locations 171, 174, 177, 180.

After defining the second set of memory locations 170, 171, 173, 174, 176, 177, 179, 180 the Dynamic Interleaver 150 dynamically configures the memory locations 170, 171, 173, 174, 176, 177, 179, 180 in the memory space 160 according to the second interleaving distribution such that the second interleaving distribution spans the two physical memory modules 160-1, 160-2 and the second set of memory locations 170, 171, 173, 174, 176, 177, 179, 180.

By decreasing the number of interleaved memory locations, the Dynamic Interleaver 150 decreases the power consumption burden currently experienced in the memory space 160 as existing processes access the first set of memory locations 170 ... 181, 190 ... 193 interleaved according to the first interleaving distribution.

Since the second interleaving distribution is defined as not including memory locations 172, 175, 178, 181, 190, 191, 192, 193 from two physical memory modules 160-3, 160-4, those interleaved memory locations 172, 175, 178, 181, 190, 191, 192, 193 (as depicted in FIG. 2) are released from the first interleaving distribution (spanning memory locations 170 ... 181, 190 ... 193—as depicted in FIG. 2). Upon release, a power manager 150-3 can set the state of the physical memory modules 160-3, 160-4 and/or the memory locations 172, 175, 178, 181, 190, 191, 192, 193 to a state that consumes less power than their state when they were interleaved according to the first interleaving distribution.

Thus, in contrast to conventional interleaving, the Dynamic Interleaver 150 can re-interleave memory locations in a memory space 160 to control the power consumed by interleaved memory locations. In one embodiment, currently interleaved memory locations can by dynamically re-interleaved with unused (or slightly unused) memory locations to increase an amount of interleaved memory locations.

In another embodiment, currently interleaved memory locations can by dynamically re-interleaved to decrease an amount of interleaved memory locations. Memory locations that are released from the interleaving distribution can be set to states that consume less power than they were consuming while interleaved.

Figure 4:
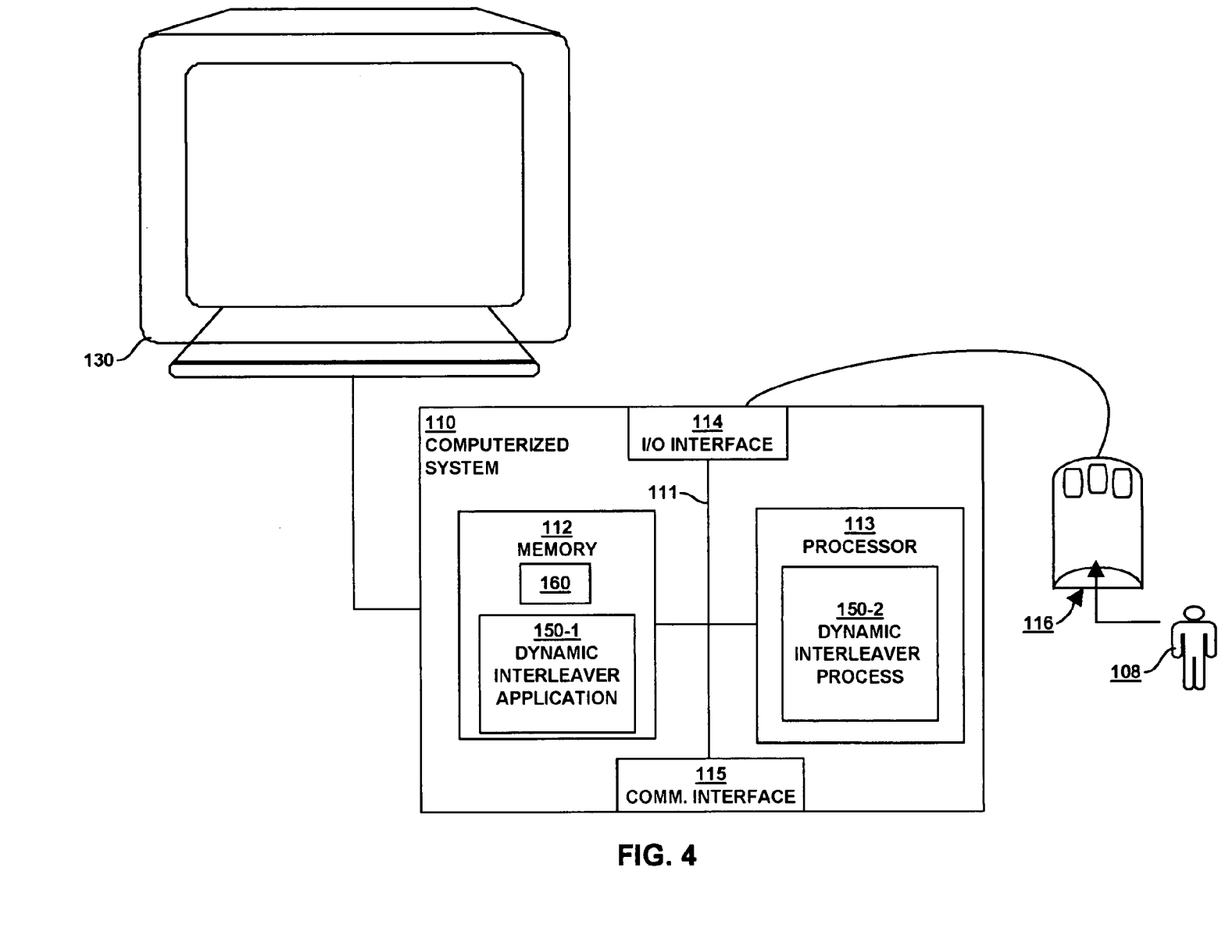
FIG. 4 is an example block diagram of a computer system configured with a Dynamic Interleaver according to embodiments herein.

FIG. 4 is an example block diagram of a computer system configured with a Dynamic Interleaver 150 according to embodiments herein. The computer system 110 executes, runs, interprets, operates or otherwise performs a Dynamic Interleaver application 150-1 and/or Dynamic Interleaver process 150-2 (e.g. an executing version of a Dynamic Interleaver 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments. In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Dynamic Interleaver 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Dynamic Interleaver application 150-1 and/or the Dynamic Interleaver process 150-2 can be distributed and executed in multiple nodes in a computer network environment or performed locally on a single computer.

The Dynamic Interleaver application 150-1 may be stored on a computer readable medium (such as a floppy disk), hard disk, electronic, magnetic, optical, or other computer readable medium. It is understood that embodiments and techniques discussed herein are well suited for other applications as well.

The memory system 112 can be any type of computer readable medium (e.g., tangible computer readable medium) and, in this example, is encoded with a Dynamic Interleaver application 150-1 that supports dynamic interleaving of physical memory locations and/or memory locations.

During operation of the computer system 110, the processor 113 accesses the memory system 112 via the interconnect 111 in order to launch, run, execute, interpret or otherwise perform the logic instructions of the Dynamic Interleaver application 150-1. Execution of the Dynamic Interleaver application 150-1 in this manner produces the Dynamic Interleaver process 150-2. In other words, the Dynamic Interleaver process 150-2 represents one or more portions or runtime instances of the Dynamic Interleaver application 150-1 (or the entire application 150-1) performing or executing within or upon the processor 113 in the computerized device 110 at runtime.

Those skilled in the art will understand that the computer system 110 may include other processes and/or software and hardware components, such as an operating system. Display 130 need not be coupled directly to computer system 110. For example, the Dynamic Interleaver application 150-1 can be executed on a remotely accessible computerized device via the communication interface 115.

FIG. 5 through FIG. 9 illustrate various embodiments of the Dynamic Interleaver 150. The rectangular elements in flowcharts 500, 600, 700, 800 and 900 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 500, 600, 700, 800 and 900 do not necessarily depict the syntax of any particular programming language. Rather, flowcharts 500, 600, 700, 800 and 900 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 5:
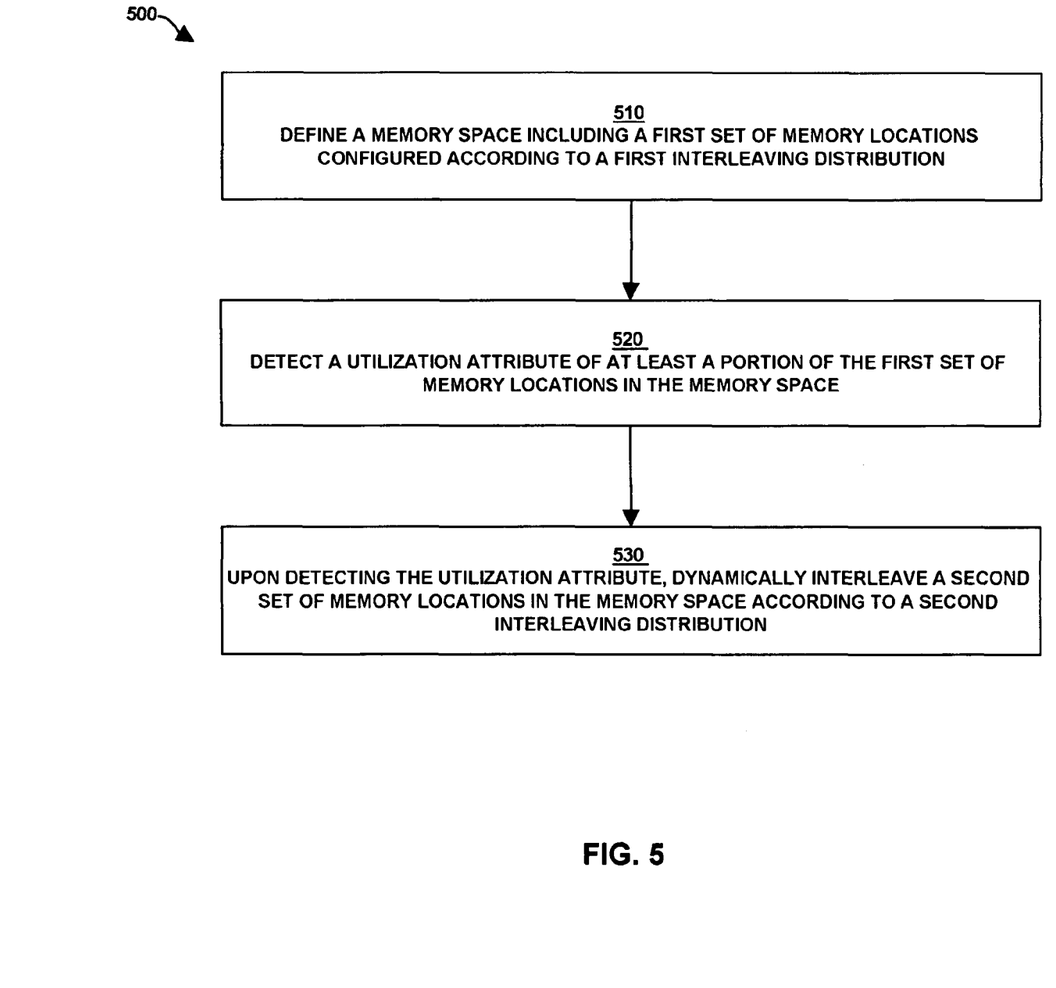
FIG. 5 is an example flowchart of processing steps performed by the Dynamic Interleaver to dynamically interleave memory locations in a memory space according to embodiments herein.

With regard to FIG. 5, FIG. 5 is an example flowchart 500 of processing steps performed by the Dynamic Interleaver 150 to dynamically interleave memory locations 170 . . . 181, 190 . . . 193 in a memory space 160 according to embodiments herein.

At step 510, the Dynamic Interleaver 150 defines the memory space 160 as including a first set of memory locations 170 . . . 181 configured according to a first interleaving distribution.

At step 520, the Dynamic Interleaver 150 detects a utilization attribute of a portion of the first set of memory locations 170 . . . 181 in the memory space 160.

At step 530, upon detecting the utilization attribute, the Dynamic Interleaver 150 dynamically interleaves a second set of memory locations 170 . . . 181, 190 . . . 193 in the memory space 160 according to a second interleaving distribution. Thus, memory locations 170 . . . 181 are re-interleaved with unused memory locations 190 . . . 193 to create the second set of memory locations 170 . . . 181, 190 . . . 193 interleaved according to the second interleaving distribution.

Figure 6:
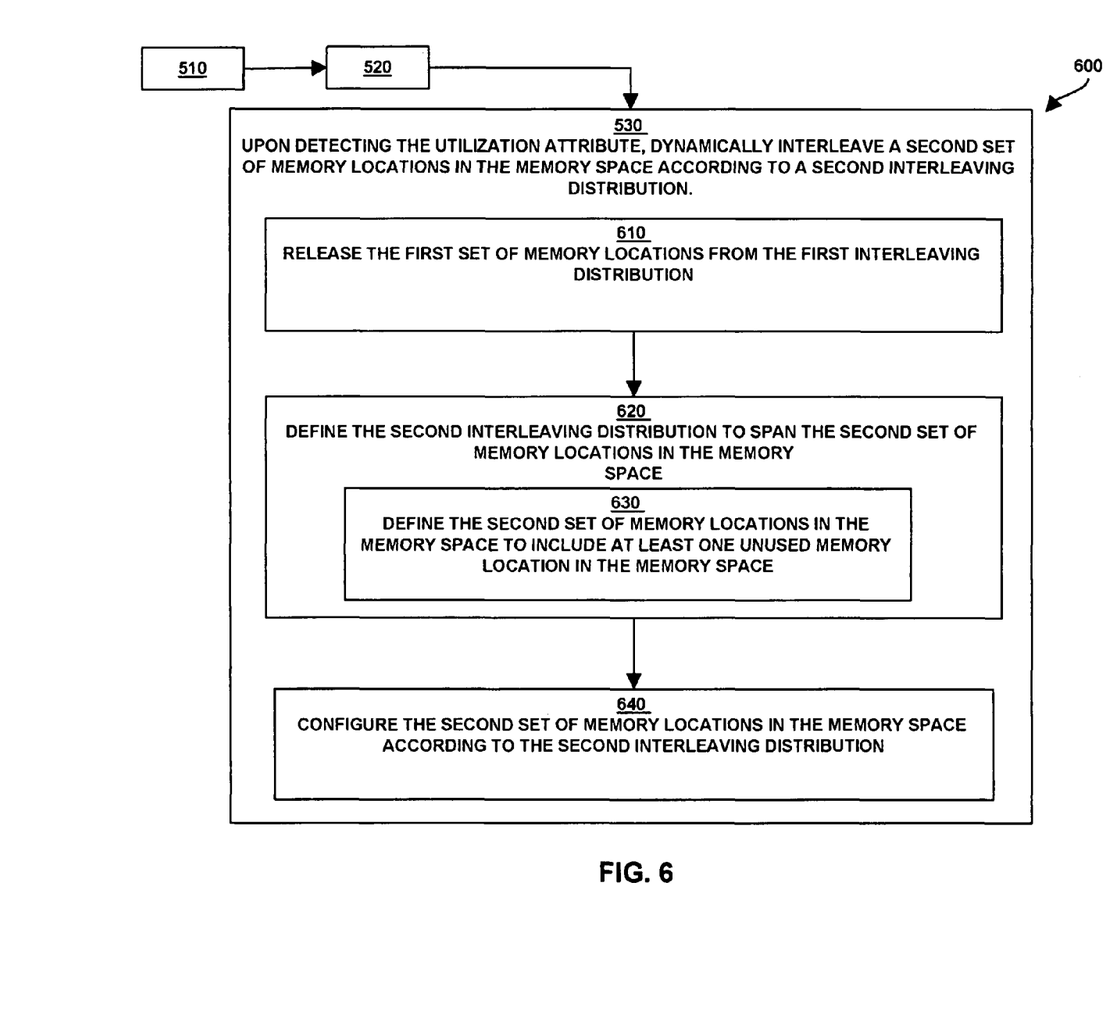
FIG. 6 is an example flowchart of processing steps performed by the Dynamic Interleaver to configure memory locations in a memory space according a second interleaving distribution according to embodiments herein.

Turning now to FIG. 6, FIG. 6 is an example flowchart 600 of processing steps performed by the Dynamic Interleaver 150 to configure memory locations 170 . . . 181, 190 . . . 193 in a memory space 160 according a second interleaving distribution according to embodiments herein.

At step 610, the Dynamic Interleaver 150 releases the first set of memory locations 170 . . . 181 from the first interleaving distribution.

At step 620, the Dynamic Interleaver 150 defines the second interleaving distribution to span the second set of memory locations 170 . . . 181, 190 . . . 193 in the memory space 160.

At step 630, the Dynamic Interleaver 150 defines the second set of memory locations 170 . . . 181, 190 . . . 193 in the memory space 160 to include memory locations 190 . . . 193 in the memory space 160.

At step 640, the Dynamic Interleaver 150 configures the second set of memory locations 170 ... 181, 190 ... 193 in the memory space 160 according to the second interleaving distribution.

Figure 7:
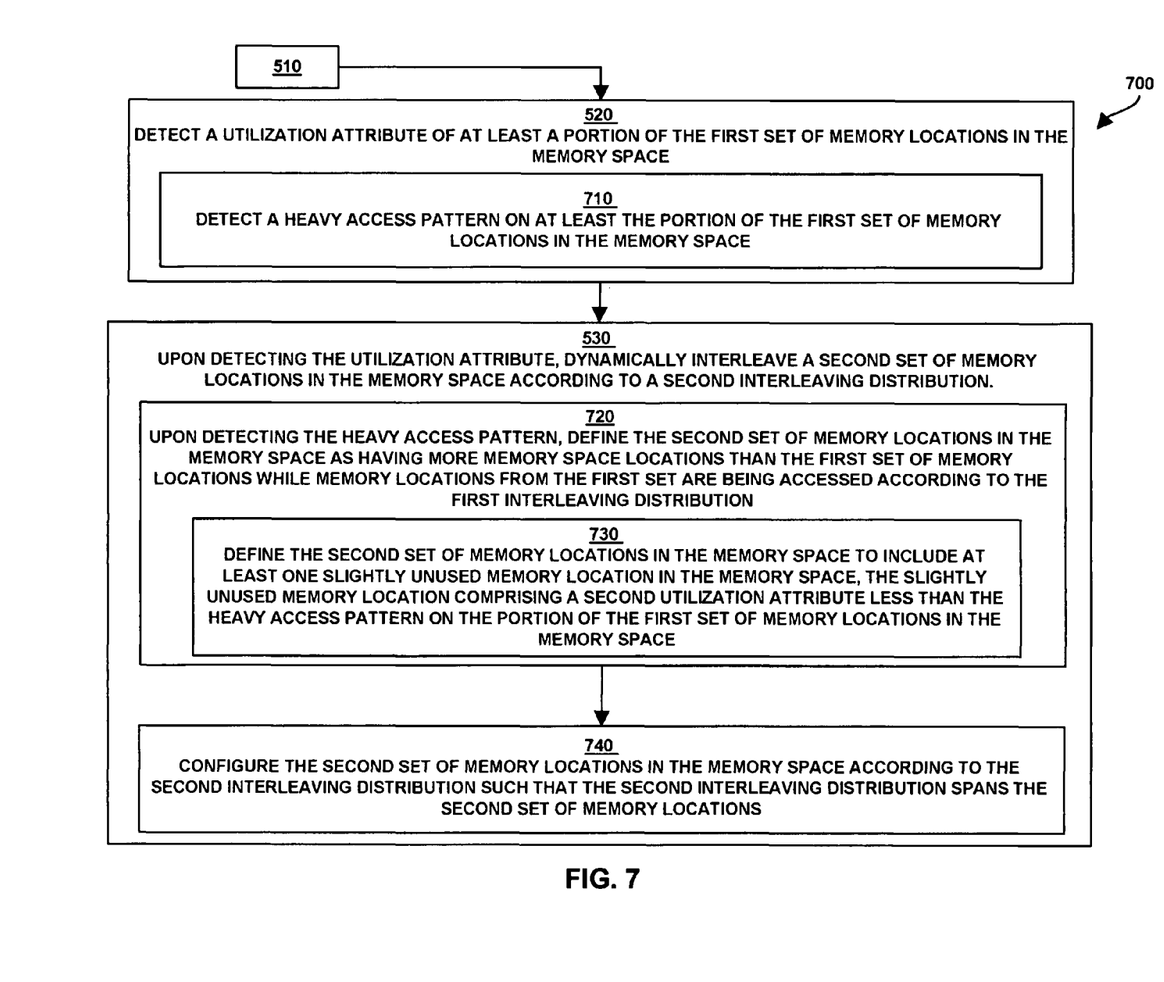
FIG. 7 is an example flowchart of processing steps performed by the Dynamic Interleaver to define a second set or memory locations in a memory space as having more memory locations than a first set of memory locations according to embodiments herein.

FIG. 7 is an example flowchart 700 of processing steps performed by the Dynamic Interleaver 150 to define a second set or memory locations 170 ... 181, 190 ... 193 in a memory space 160 as having more memory locations than a first set of memory locations 170 ... 181 according to embodiments herein.

At step 710, the Dynamic Interleaver 150 detects a heavy access pattern on a portion of the first set of memory locations 170 ... 181 in the memory space 160.

At step 720, upon detecting the heavy access pattern, the Dynamic Interleaver 150 defines the second set of memory locations 170 ... 181, 190 ... 193 in the memory space 160 as having more memory space locations than the first set of memory locations 170 ... 181 while at least one memory location 170 ... 181 from the first set is being accessed according to the first interleaving distribution At step 730, the Dynamic Interleaver 150 defines the second set of memory locations in the memory space 160 to include slightly unused memory locations in the memory space. The slightly unused memory locations comprise a utilization attribute less than the heavy access pattern on the portion of the first set of memory locations 170 ... 181 in the memory space 160.

At step 740, the Dynamic Interleaver 150 configures the second set of memory locations 170 ... 181, 190 ... 193 in the memory space 160 according to the second interleaving distribution such that the second interleaving distribution spans the second set of memory locations 170 ... 181, 190 ... 193.

Figure 8:
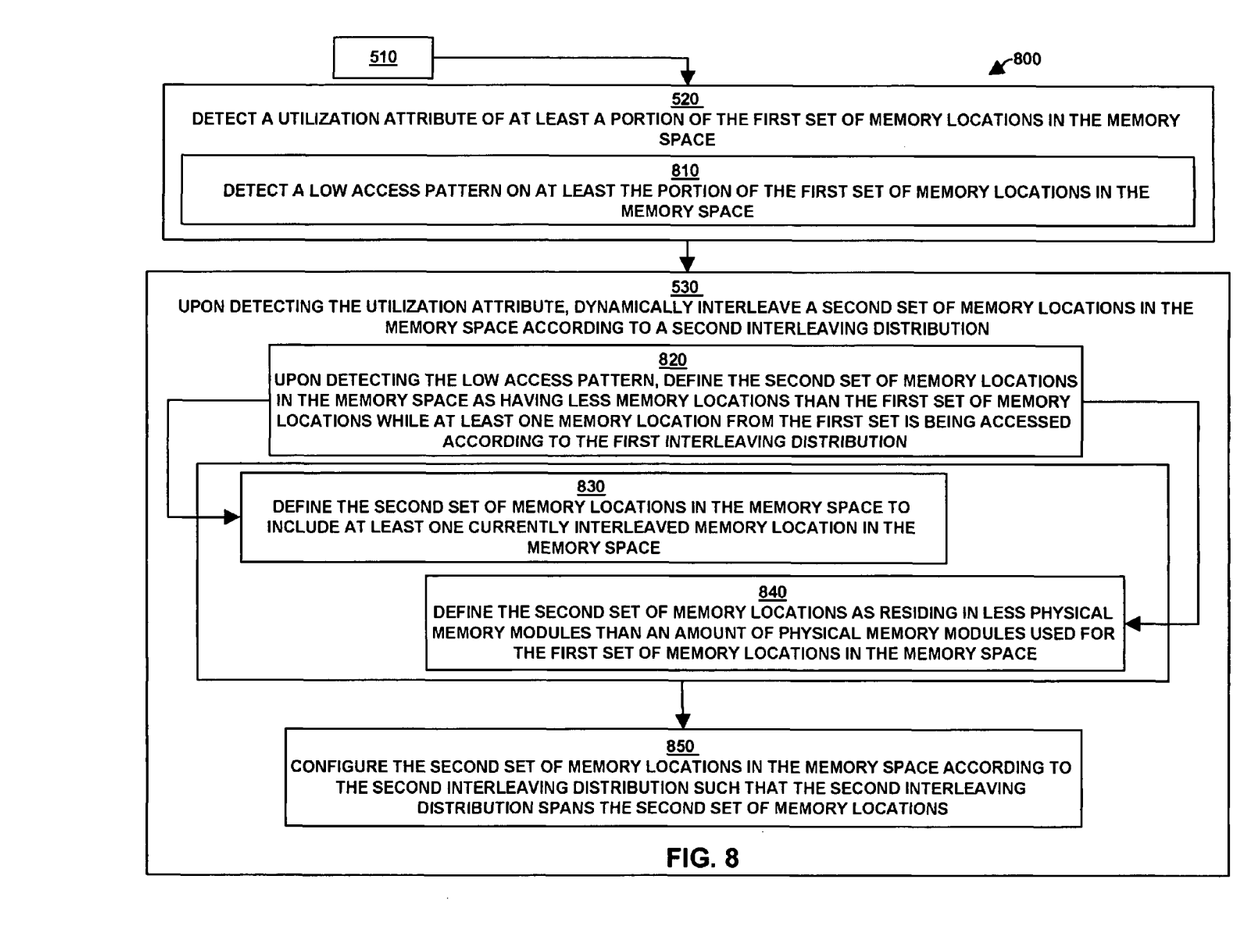
FIG. 8 is an example flowchart of processing steps performed by the Dynamic Interleaver to define a second set or memory locations in a memory space as having less memory locations than a first set of memory locations to according embodiments herein.

Regarding FIG. 8, FIG. 8 is an example flowchart 800 of processing steps performed by the Dynamic Interleaver 150 to define a second set or memory locations 170, 171, 173, 174, 176, 177, 179, 180 in a memory space 160 as having less memory locations than a first set of memory locations 170 ... 181, 190 ... 193 according to embodiments herein.

At step 810, the Dynamic Interleaver 150 detects a low access pattern on at least a portion of the first set of memory locations 170 ... 181, 190 ... 193 in the memory space 160.

At step 820, upon detecting the low access pattern, the Dynamic Interleaver 150 defines the second set of memory locations 170, 171, 173, 174, 176, 177, 179, 180 in the memory space 160 as having less memory space locations than the first set of memory locations 170 ... 181, 190 ... 193 while at least one memory location from the first set is being accessed according to the first interleaving distribution.

At step 830, the Dynamic Interleaver 150 defines the second set of memory locations 170, 171, 173, 174, 176, 177, 179, 180 in the memory space 160 to include one or more currently interleaved memory locations 170 ... 181, 190 ... 193 in the memory space 160.

In the alternative, at step 840, the Dynamic Interleaver 150 defines the second set of memory locations 170, 171, 173, 174, 176, 177, 179, 180 as residing in less physical memory modules 160-1, 160-2 than an amount of physical memory modules 160-1, 160-2, 160-3, 160-4 used for the first set of memory locations 170 ... 181, 190 ... 193 in the memory space 160.

At step 850, the Dynamic Interleaver 150 configures the second set of memory locations 170, 171, 173, 174, 176, 177, 179, 180 in the memory space 160 according to the second interleaving distribution such that the second interleaving distribution spans the second set of memory locations 170, 171, 173, 174, 176, 177, 179, 180.

Figure 9:
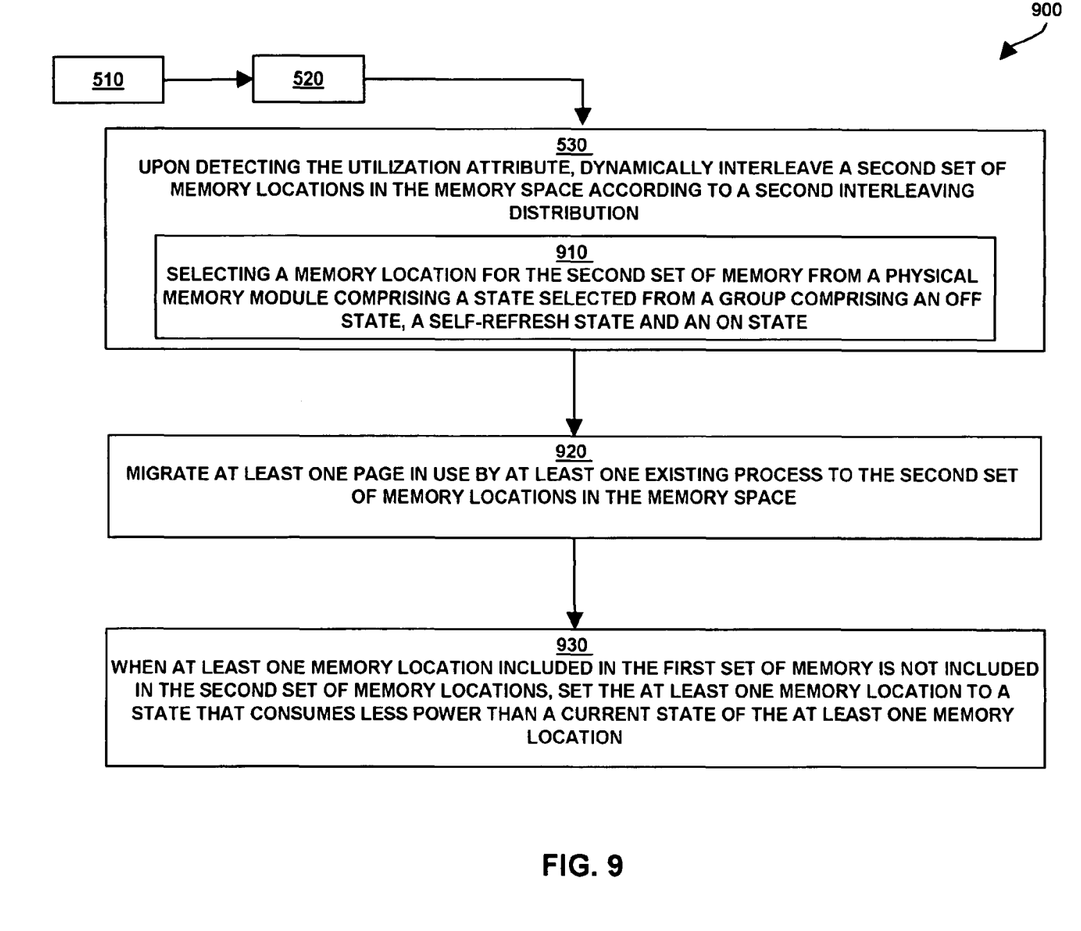
FIG. 9 is an example flowchart of processing steps performed by the Dynamic Interleaver to migrate a page in use by an existing process to a second set of memory locations according to embodiments herein.

FIG. 9 is an example flowchart 900 of processing steps performed by a Dynamic Interleaver 150 to migrate a page in use by an existing process to a second set of memory locations 170, 171, 173, 174, 176, 177, 179, 180 according to embodiments herein.

At step 910, while dynamically interleaving the second set of memory locations 170, 171, 173, 174, 176, 177, 179, 180 the Dynamic Interleaver 150 selects memory locations a physical memory modules comprising an off state, a self-refresh state or an on state.

It is understood that the off state results in a physical memory module being inaccessible and experiencing a loss of content. The self-refresh state results in a physical memory module being inaccessible and experiencing a retention of content. The on state results in a physical memory module being accessible and experiencing retention of content.

At step 920, the Dynamic Interleaver 150 migrates pages in use by existing process to the second set of memory locations 170, 171, 173, 174, 176, 177, 179, 180 in the memory space 160.

At step 930, when a one memory location included in the first set of memory 170 ... 181, 190 ... 193 is not included in the second set of memory locations 170, 171, 173, 174, 176, 177, 179, 180, the Dynamic Interleaver 150 sets the memory location 172, 175, 178, 181, 190 ... 193 to a state that consumes less power than a current state of the memory location 172, 175, 178, 181, 190 ... 193.

Note again that techniques herein are well suited for a Dynamic Interleaver 150 that allows for continually modifying an interleaving distribution that spans physical memory modules in a memory space. The Dynamic Interleaver 150 thereby ensures that an interleaved address range is not disrupted and can set physical memory modules (and their memory locations) to low power consuming states upon release from a currently interleaved group of physical memory modules.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted. As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed.

Accordingly, the methods and systems may utilize multiple processors and/or processor devices, and the processor instructions may be divided amongst such single- or multiple-processor/devices. The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. The devices provided herein are not exhaustive and are provided for illustration and not limitation.

References to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of dynamic interleaving in a computer memory, the method comprising:
    defining a memory space including a first set of memory locations configured according to a first interleaving distribution;
    detecting a utilization attribute of at least a portion of the first set of memory locations in the memory space;
    upon detecting the utilization attribute, dynamically interleaving a second set of memory locations in the memory space according to a second interleaving distribution; and
    when at least one memory location included in the first set of memory locations is not included in the second set of memory locations, setting the at least one memory location to a state that consumes less power than a current state of the at least one memory location.

2. The method as in claim 1, wherein dynamically interleaving the second set of memory locations in the memory space according to the second interleaving distribution includes:
    releasing the first set of memory locations from the first interleaving distribution;
    defining the second interleaving distribution to span the second set of memory locations in the memory space; and
    configuring the second set of memory locations in the memory space according to the second interleaving distribution.

3. The method as in claim 2, wherein defining the second interleaving distribution to span the second set of memory locations in the memory space includes at least one of:
    i) defining the second set of memory locations in the memory space to include at least one unused memory location in the memory space;
    ii) defining the second set of memory locations in the memory space to include at least one memory location of the first set of memory locations;
    iii) defining the second set of memory locations in the memory space to include less memory locations that the first set of memory locations; and
    iv) defining the second set of memory locations in the memory space to include more memory locations than the first set of memory locations.

4. The method as in claim 1, wherein detecting the utilization attribute of at least the portion of the first set of memory locations space includes one of:
    detecting a heavy access pattern on at least the portion of the first set of memory locations in the memory space; and
    detecting a low access pattern on at least the portion of the first set of memory locations in the memory space.

5. The method as in claim 4, wherein, upon detecting the utilization attribute, dynamically interleaving the second set of memory locations in the memory space according to the second interleaving distribution includes:
    upon detecting the heavy access pattern, defining the second set of memory locations in the memory space as having more memory space locations that the first set of memory locations while at least one memory location from the first set is being accessed according to the first interleaving distribution; and
    configuring the second set of memory locations in the memory space according to the second interleaving distribution such that the second interleaving distribution spans the second set of memory locations.

6. The method as in claim 5, wherein defining the second set of memory locations in the memory space as having more memory space locations than the first set of memory locations includes:
    defining the second set of memory locations in the memory space to include at least one slightly unused memory location in the memory space, the at least one slightly unused memory location comprising a second utilization attribute less than the heavy access pattern in at least the portion of the first set of memory locations in the memory space.

7. The method as in claim 4, wherein, upon detecting the utilization attribute, dynamically interleaving the second set of memory locations in the memory space according to the second interleaving distribution includes:
    upon detecting the low access pattern, defining the second set of memory locations in the memory space as having less memory space locations that the first set of memory locations while at least one memory location from the first set is being accessed according to the first interleaving distribution; and configuring the second set of memory locations in the memory space according to the second interleaving distribution such that the second interleaving distribution spans the second set of memory locations.

8. The method as in claim 7, wherein defining the second set of memory locations in the memory space as having less memory space locations than the first set of memory locations includes at least one of:

defining the second set of memory locations in the memory space to include at least one currently interleaved memory location in the memory space; and defining the second set of memory locations as residing in less physical memory modules than an amount of physical memory modules used for the first set of memory locations in the memory space.

9. The method as in claim 1, wherein dynamically interleaving the second set of memory locations in the memory space according to the second interleaving distribution includes:

releasing the first set of memory locations from the first interleaving distribution such that the first set of memory locations are removed from operating system usage, which includes:

migrating data in the first set of memory locations to an allocated set of memory locations separate from the first and second set of memory locations; and upon dynamically interleaving the second set of memory locations, mapping the data to the second set of memory locations.

10. The method as in claim 1, wherein, upon detecting the utilization attribute, dynamically interleaving the second set of memory locations in the memory space according to the second interleaving distribution includes:

selecting a memory location for the second set of memory from a physical memory module comprising a state, the state selected from a group comprising an off state, a self-refresh state and an on state.

11. The method of claim 10, further comprising:

defining the off state to result in the physical memory module being inaccessible and experiencing a loss of content;

defining the self-refresh state to result in the physical memory module being inaccessible and experiencing a retention of the content; and defining the on state to result in the physical memory module being accessible and experiencing the retention of content.

12. A computer readable storage medium comprising non-transitory executable instructions encoded thereon operable on a computerized device to perform processing comprising:

instructions for defining a memory space including a first set of memory locations configured according to a first interleaving distribution;

instructions for detecting a utilization attribute of at least a portion of the first set of memory locations in the memory space;

instructions for upon detecting the utilization attribute, dynamically interleaving a second set of memory locations in the memory space according to a second interleaving distribution; and when at least one memory location included in the first set of memory locations is not included in the second set of memory locations, instructions for setting the at least one memory location to a state that consumes less power than a current state of the at least one memory location.

13. The computer readable medium as in claim 12, wherein the instructions for dynamically interleaving the second set of memory locations in the memory space according to the second interleaving distribution include:

instructions for releasing the first set of memory locations from the first interleaving distribution;

instructions for defining the second interleaving distribution to span the second set of memory locations in the memory space; and instructions for configuring the second set of memory locations in the memory space according to the second interleaving distribution.

14. The computer readable medium as in claim 12, wherein the instructions for detecting the utilization attribute of at least the portion of the first set of memory locations space includes one of:

instructions for detecting a heavy access pattern on at least the portion of the first set of memory locations in the memory space; and instructions for detecting a low access pattern on at least the portion of the first set of memory locations in the memory space.

15. The computer readable medium as in claim 14, wherein the instructions for dynamically interleaving the second set of memory locations in the memory space according to the second interleaving distribution include:

upon detecting the heavy access pattern, instructions for defining the second set of memory locations in the memory space as having more memory space locations that the first set of memory locations while at least one memory location from the first set is being accessed according to the first interleaving distribution; and instructions for configuring the second set of memory locations in the memory space according to the second interleaving distribution such that the second interleaving distribution spans the second set of memory locations.

16. The computer readable medium as in claim 15, wherein the instructions for defining the second set of memory locations in the memory space as having more memory space locations than the first set of memory locations include:

instructions for defining the second set of memory locations in the memory space to include at least one slightly unused memory location in the memory space, the at least one slightly unused memory location comprising a second utilization attribute less than the heavy access pattern in at least the portion of the first set of memory locations in the memory space.

17. The computer readable medium as in claim 14, wherein the instructions for dynamically interleaving the second set of memory locations in the memory space according to the second interleaving distribution includes:

upon detecting the low access pattern, instructions for defining the second set of memory locations in the memory space as having less memory space locations that the first set of memory locations while at least one memory location from the first set is being accessed according to the first interleaving distribution; and instructions for configuring the second set of memory locations in the memory space according to the second interleaving distribution such that the second interleaving distribution spans the second set of memory locations.

18. The computer readable medium as in claim 17, wherein the instructions for defining the second set of memory locations in the memory space as having less memory space locations than the first set of memory locations includes at least one of:

instructions for defining the second set of memory locations in the memory space to include at least one currently interleaved memory location in the memory space; and instructions for defining the second set of memory locations as residing in less physical memory modules than an amount of physical memory modules used for the first set of memory locations in the memory space.

19. The computer readable medium as in claim 12, further comprising:

instructions for migrating at least one page in use by at least one existing process to the second set of memory locations in the memory space.

20. A computer system comprising:

a processor;

a memory unit that stores instructions associated with an application executed by the processor; and an interconnect coupling the processor and the memory unit, enabling the computer system to execute the application and perform operations of:

defining a memory space including a first set of memory locations configured according to a first interleaving distribution;

detecting a utilization attribute of at least a portion of the first set of memory locations in the memory space;

upon detecting the utilization attribute, dynamically interleaving a second set of memory locations in the memory space according to a second interleaving distribution; and when at least one memory location included in the first set of memory locations is not included in the second set of memory locations, setting the at least one memory location to a state that consumes less power than a current state of the at least one memory location.

* * * * *

UNITED STATES PATENT AND TRADEMARK OFFICE
CERTIFICATE OF CORRECTION

| | | |
|---|---|---|
| PATENT NO. | : 7,979,648 B2 | Page 1 of 1 |
| APPLICATION NO. | : 12/130491 | |
| DATED | : July 12, 2011 | |
| INVENTOR(S) | : Eric C. Saxe et al. | |

It is certified that error appears in the above-identified patent and that said Letters Patent is hereby corrected as shown below:

Column 14, Line 42, Claim 5:
Delete "that" and insert -- than --.

Column 16, Line 33, Claim 15:
Delete "that" and insert -- than --.

Column 16, Line 59, Claim 17:
Delete "that" and insert -- than --.

Signed and Sealed this
Eighteenth Day of October, 2011

David J. Kappos
*Director of the United States Patent and Trademark Office*